(12) United States Patent
Kesavan

(10) Patent No.: US 11,949,569 B2
(45) Date of Patent: *Apr. 2, 2024

(54) RECOMMENDATION SYSTEM WITH PERFORMANCE MANAGEMENT

(71) Applicant: Verizon Patent and Licensing Inc., Basking Ridge, NJ (US)

(72) Inventor: Sundara Kesavan, Chennai (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/310,145

(22) Filed: May 1, 2023

(65) Prior Publication Data

US 2023/0283535 A1 Sep. 7, 2023

Related U.S. Application Data

(63) Continuation of application No. 17/686,519, filed on Mar. 4, 2022, now Pat. No. 11,683,245.

(51) Int. Cl.
| | |
|---|---|
| *H04L 41/5061* | (2022.01) |
| *G06F 16/9032* | (2019.01) |
| *G06F 16/9035* | (2019.01) |
| *G06F 16/9038* | (2019.01) |
| *G06F 18/22* | (2023.01) |

(52) U.S. Cl.
CPC .... *H04L 41/5061* (2013.01); *G06F 16/90328* (2019.01); *G06F 16/9035* (2019.01); *G06F 16/9038* (2019.01); *G06F 18/22* (2023.01)

(58) Field of Classification Search
CPC ............. H04L 41/5061; G06F 16/9038; G06F 16/90328; G06F 16/9035; G06F 18/22
See application file for complete search history.

(56) References Cited

U.S. PATENT DOCUMENTS

| | | |
|---|---|---|
| 9,740,668 B1 | 8/2017 | Saurav |
| 11,442,947 B2 | 9/2022 | Wan et al. |
| 2016/0019587 A1* | 1/2016 | Hueter ................ G06Q 10/04 705/14.53 |
| 2016/0104069 A1 | 4/2016 | Garg et al. |
| 2020/0034857 A1 | 1/2020 | Choi |
| 2020/0106880 A1 | 4/2020 | Côté et al. |
| 2020/0151587 A1 | 5/2020 | Ahringer et al. |
| 2021/0004682 A1* | 1/2021 | Gong .................... G06N 3/08 |
| 2021/0110288 A1 | 4/2021 | Poothiyot et al. |
| 2021/0142292 A1 | 5/2021 | Ozcaglar et al. |
| 2021/0174164 A1 | 6/2021 | Hsieh et al. |

(Continued)

OTHER PUBLICATIONS

Liu et al. "Personalized App Recommendation Based on Hierarchical Embedding", 2018 IEEE SmarttWorld, Oct. 8, 2018.*

(Continued)

*Primary Examiner* — Todd L Barker

(57) ABSTRACT

A method, a device, and a non-transitory storage medium are described, which provide a recommendation system with performance management service. The service may include selecting and ranking content that relate to a user query and a problem associated with an application and/or a device. The service may include invoking a remedial procedure based on user feedback data. The service may include similarity and classification models based on successful recommendation records.

20 Claims, 4 Drawing Sheets

100

(56) References Cited

U.S. PATENT DOCUMENTS

2021/0217323 A1     7/2021   Agley et al.
2021/0374132 A1*   12/2021   Yang ................... G06F 16/2457
2022/0100767 A1     3/2022   Ghoshal et al.

OTHER PUBLICATIONS

Zhu et al., "A Mobile Application Recommendation Framework by Exploiting Personal Preference with Constraints", Jun. 2017.*
Shi et al., "Detecting Anomolies in Appication Performance Management System with Machine Learning Algorithms", 2019 3rd International Conference on Electronic Information Technology and Computer Engineering, Oct. 18, 2019.*
Poghosyan et al., "Managing Cloud Infrastructures by a Multi-layer Data Analytics", 2016 IEEE International Conference on Autonomic Computing , Jul. 17, 2016.*
Lian, et al., "AutoSys: The Design and Operation of Learning-Augmented Systems", 2020 USENIX Annual Technical Conference, Jul. 15, 2020, 15 pages total.
Wang, et al., "Enterprise Search with development for network management system", IEEE International Congress on Big Data, Jun. 27, 2015, IEEE Publishing.
Wressnegger, et al., "ZOE: Content Based Anomaly Detection for Industrial Control Systems", 48th Annual IEEE/IFIP International Conference on Dependable Systems and Networks, Jun. 25, 2018, IEEE Publishing.
Zuo, et al., "An Intelligent Anomaly Detection Scheme for Micro-Services Architectures With Temporal and Spatial Data Analysis", IEEE Transactions on Cognitive Communications and Networking (vol. 6, Issue 2), Jun. 2020, pp. 548-561, IEEE Publishing.

* cited by examiner

RECOMMENDATION SYSTEM WITH PERFORMANCE MANAGEMENT

CROSS REFERENCE TO RELATED APPLICATION

This patent application is a continuation of U.S. patent application Ser. No. 17/686,519 entitled "RECOMMENDATION SYSTEM WITH PERFORMANCE MANAGEMENT" and filed on Mar. 4, 2022, the disclosure of which is incorporated by reference herein in its entirety.

BACKGROUND

A service, responsive to a query received from a user, may use search, selection, and recommendation systems that filter, identify, and present content that are potentially relevant to the query.

DETAILED DESCRIPTION

Figure 1:
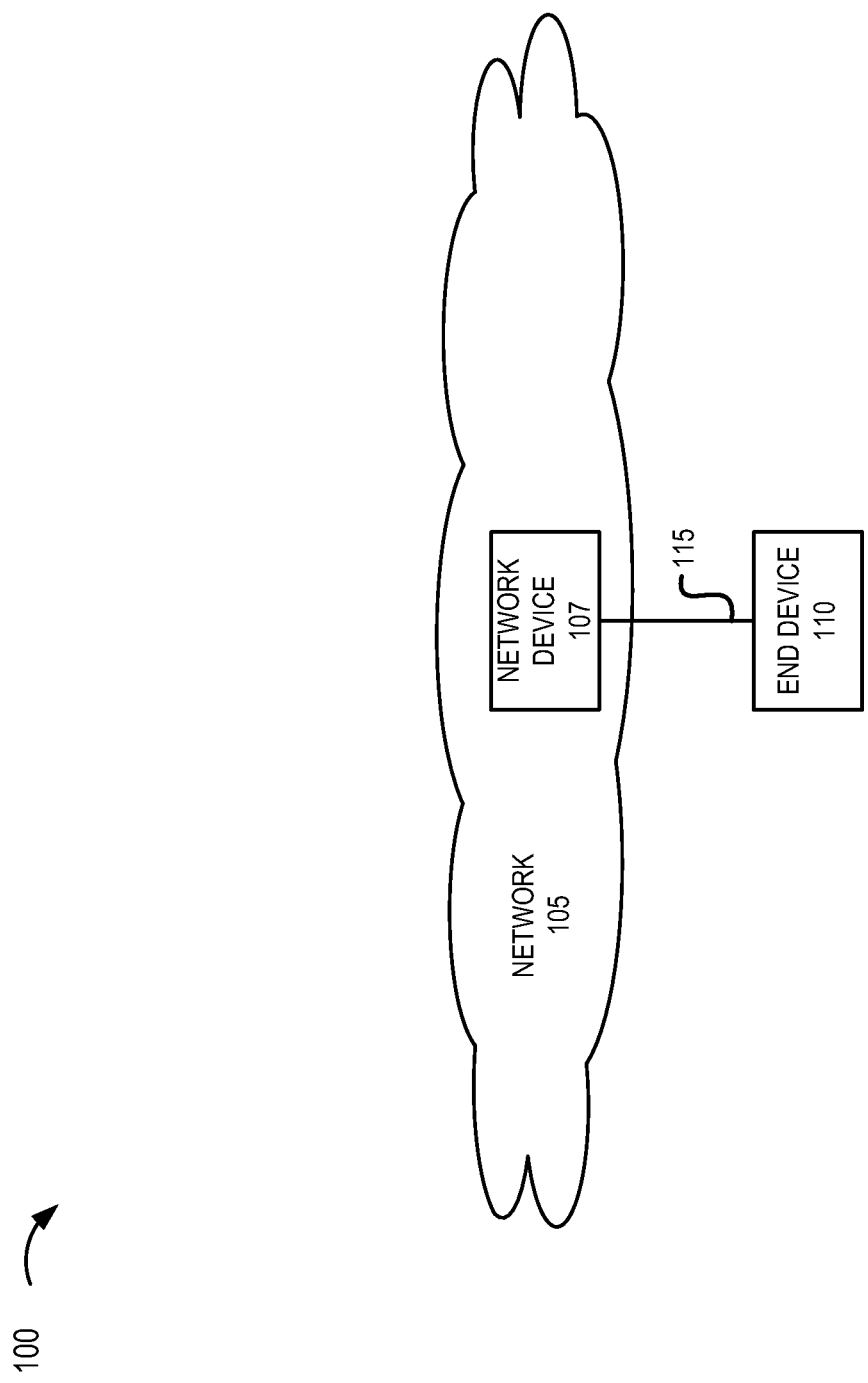
FIG. 1 is a diagram illustrating an exemplary environment in which exemplary embodiments of a recommendation system with performance management service may be implemented.

The following detailed description refers to the accompanying drawings. The same reference numbers in different drawings may identify the same or similar elements. Also, the following detailed description does not limit the invention.

Service providers, organizations, or other types of entities or businesses may provide customer service centers, call centers, help desks, tools, and/or other kinds of platforms, for example, to enable a user to resolve an issue or problem. A significant volume of contact or use of these resources may relate to known and repetitive issues. As such, these resources may not be optimally utilized. For example, the user may be able to solve a given problem by a knowledge article or through a guided self-help measure.

Data is, however, everchanging. As such, data drift may impact the relevance of data and/or a solution to a given problem over time. This presents a technical challenge to identify the correct data by an agent, the user, a system, or a device, for example. A current recommendation system for a service desk, for example, may be implemented within a platform that restricts interface with the diverse array of applications and bots used for the presentment of queries by users.

Also, current recommendation systems may not include self-measuring and performance monitoring. This can be a technical challenge and is lacking in current ticketing tools and systems. Consequently, the recommendation system may not include logic that alerts an administrator when the performance is below a threshold value or exhibits a declining performance behavior.

According to exemplary embodiments, a recommendation system with performance management service is described. According to an exemplary embodiment, the recommendation system with performance management service may be implemented in a service desk or product support environment and/or context. According to other exemplary embodiments, the recommendation system with performance management service may be implemented in other types of environments and/or contexts in which content recommendation may be suited.

According to an exemplary embodiment, the recommendation system with performance management service may include an application programming interface (API) logic that provides an API service which is compatible with a multitude of applications, bots, and/or other types of user interfaces, for example, and provides a portability or flexibility not available in current platforms. According to an exemplary embodiment, the recommendation system with performance management service may include artificial intelligence and/or machine learning (AI/ML) logic that may predict a user intent and/or an application or a device to which an issue and user query relate based on the user query.

According to an exemplary embodiment, the recommendation system with performance management service may include AI/ML logic that provides a recommendation service based on the user query and predicted user intent, application, or device. According to an exemplary embodiment, the recommendation service may select recommendation content based on similarity, weighting, ranking, and anomaly criteria, as described herein.

According to an exemplary embodiment, the recommendation system with performance management service may include an updating service for content that reduces the effect of data draft, as described herein. According to an exemplary embodiment, the recommendation system with performance management service may include a performance management service that may include monitoring and measuring performance and providing feedback operations. The feedback operations may include providing alerts and/or other types of remedial measures, as described herein.

In view of the foregoing, the recommendation system with performance management service may reduce overall content search time, reduce utilization of processing resources (e.g., processor, memory, etc.), reduce user effort and time involvement required to reach the intended content, and present content to a user for consideration and selection more efficiently and/or accurately. As a consequence, the recommendation system with performance management service may minimize the volume of service desk contact while also assisting the user in resolving an issue or problem, for example.

The recommendation system with performance management service may achieve improved performance and accuracy based on the multi-criteria content recommendation service from contents subject to the updating service, as described herein. The recommendation system with performance management service may improve portability and accessibility via the API service, as described herein. The recommendation system with performance management service may also improve in its performance based on the performance management service, as described herein.

FIG. 1 is a diagram illustrating an exemplary environment 100 in which an exemplary embodiment of the recommendation system with performance management service may be implemented. As illustrated, environment 100 may include a network 105. Network 105 may include a network device 107. Environment 100 may include an end device 110.

Environment 100 may include a communication link 115 between network 105 and network device 107 and/or between end device 110 and network 105 and/or network device 107. A communicative connection via communication link 115 may be direct or indirect. For example, an indirect communicative connection may involve an intermediary device and/or an intermediary network not illustrated in FIG. 1. A direct communicative connection may not involve an intermediary device and/or an intermediary network. The number and arrangement of communication link 115 illustrated in environment 100 are exemplary. Communication link 115 may be wired, wireless, and/or optical.

Network 105 may include one or multiple networks of one or multiple types and/or technologies. For example, network 105 may include a wireless network, a wired network, and/or an optical network. Network 105 may be implemented to include a local area network (LAN), a radio access network (RAN), a core network, a service provider network, a customer service network, an enterprise network, the Internet, a private network, a network operations center network, and/or another type of network that may support access to and/or use of the recommendation system with performance management service.

Network device 107 may include a network device that provides the recommendation system with performance management service, as described herein. For example, network device 107 may include a component that provides a function, a step, a process, and/or a service of the recommendation system with performance management service, as described herein. Network device 107 may include API logic, NLP logic, AI/ML logic directed to user intent/application prediction, AI/ML logic directed to content similarity and recommendation, and performance analytics, as described herein. Network device 107 may include other logic that provides a function, a step, a process, and/or a service of the recommendation system with performance management service, as described herein. Network device 107 is described further below.

End device 110 may include a device that enables a user to communicate and use the recommendation system with performance management service. For example, end device 110 may enable a user to generate a user query and communicate the user query to network device 107. According to various exemplary embodiments, end device 110 may be implemented as a mobile device, a portable device, a stationary device (e.g., a non-mobile device and/or a non-portable device), or another type of device operable by a user (e.g., a set top box, a gaming system, a digital video recorder (DVR), etc.). End device 110 may include various types of software (e.g., browsers, clients, chat bots, messaging applications, web applications or communicators, APIs, or the like) and/or other types of user interfaces (e.g., a microphone, voice to text, speech to text, graphical user interfaces (GUIs), or the like) that may receive the user query from the user. End device 110 is described further below. For purposes of description, end device 110 is not considered a network device. Additionally, in the context of a service desk or a product support system, end device 110 may or may not be the device to which the issue or query is directed. For example, according to an exemplary scenario, a printer may be the device that has a problem, but a user may access and use the recommendation system with performance management service via a computer. Alternatively, according to other exemplary scenarios, end device 110 may be the device to which the issue or the query is directed and the device that a user may access and use the recommendation system with performance management service.

Communication link 115 may include a wireless, a wired, and/or an optical link. Communication link 115 may support a communicative connection, a communication session, exchange of data, and the like.

According to other embodiments, environment 100 may include additional networks and/or different types of networks than those illustrated and described herein. The number and arrangement of network device 107 in network 105, and the number of end device 110 are exemplary. A network device, such as network device 107 may be implemented according to a centralized computing architecture, a distributed computing architecture, or a cloud computing architecture (e.g., an elastic cloud, a private cloud, a public cloud, etc.). Additionally, a network device may be implemented according to one or multiple network architectures (e.g., a client device, a server device, a peer device, a proxy device, a cloud device, a virtualized function, etc.).

Figure 2:
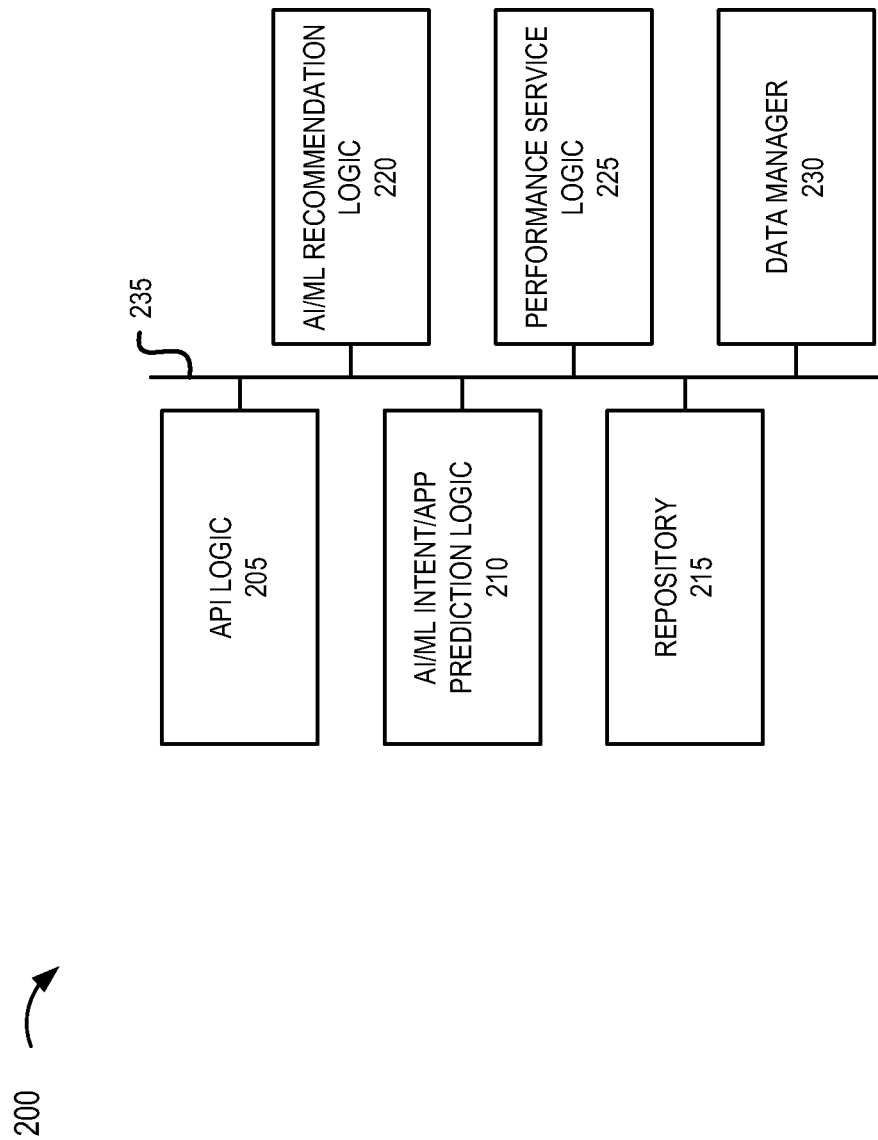
FIG. 2 is a diagram illustrating exemplary components of an exemplary embodiment of the recommendation system with performance management service.

FIG. 2 is a diagram illustrating exemplary components 200 that may provide an exemplary embodiment of the recommendation system and performance management service. For example, components 200 may include an API logic 205, an AI/ML intent/application prediction logic 210, a repository 215, an AI/ML recommendation logic 220, a performance service logic 225, a data manager 230, and a communication link 235. According to various exemplary embodiments, one or multiple components (including all components) may be implemented on one or multiple network devices 107.

API logic 205 may include APIs (e.g., API proxy, API gateway, RESTful API, and/or other types of APIs) that may receive user queries from users and/or end devices 110. API logic 205 may enable access to and use of the various other services of the recommendation system and performance management service, as described herein, such as the user intent/application service, the recommendation service, and the performance management service, for example. API logic 205 may include configurable rules and file parameters that manage the execution of processes that may run in response to requests. API logic 205 may include security, rate limitation, quotas, and/or analytic features. API logic 205 may be configured to enable an expansive array of applications, chat bots, voice, and/or other user interfaces/input associated with a user/end device 110 and a user query to interface with the various other services of the recommendation system and performance management service. API logic 205 may output the user queries to AI/ML intent/app prediction logic 210. According to some exemplary embodiments, the user queries may be in textual form, which may include a conversion of the original form of the user queries by API logic 205.

AI/ML intent/app prediction logic 210 may include a classification model that may recognize and/or predict user intent, an application, or another component of a device with which the user has an issue, a problem, or interest. AI/ML intent/app prediction logic 210 may include NLP logic. According to various exemplary embodiments, AI/ML intent/app prediction logic 210 may be implemented to include a multi-class classification model, a multi-label classification model, and/or an imbalanced classification model, for example. The classification predictive model may include a tree-based model, a transformer model, a vector-based model, and/or another type of AI/ML algorithm. For example, the AI/ML algorithm may include logistic regression, Naïve Bayes, K-Nearest Neighbors, decision tree, Random Forest, extreme gradient boosting, support vector machine, clustering via embedding, dense neural networks, convolutional neural network, long-short-timer memory network, recurrent neural network, and/or Bidirectional Encoder Representations from Transformers (BERT). According to an exemplary embodiment, AI/ML intent/app prediction logic 210 may output the user queries and the predicted intent or identification of the application, component of a device, and/or the device to AI/ML recommendation logic 220. The predicted application, device, or component may further include data indicating an issue, a problem, or a topic associated with the application, the device, or the component.

Repository 215 may store information relating to the recommendation system and performance management service. For example, repository 215 may store knowledge articles, metadata (e.g., titles, summary data, etc.) associated with multimedia (audio and/or videos, pictures, web pages, or the like), and/or other types of content that may be subject to a recommendation in view of a user query. Repository 215 may also store historical recommendation records relating to previous usage by users and user feedback data, as described herein. The recommendation records may include correlated data including user queries, user intent/application data (e.g., classifications, topics, applications, and the like), recommended contents, incident descriptions (e.g., description of issue/problem; text entered by a user via chat bot or another user interface/application, or the like). Repository 215 may interface with other components of components 200, such as API logic 205, AI/ML recommendation logic 220, performance service logic 225, and data manager 230, for example.

AI/ML recommendation logic 220 may include logic that identifies the most relevant recommendation content based on the user query and the predicted user intent/application data. According to an exemplary embodiment, AI/ML recommendation logic 220 may include one or multiple types of models, as described herein, that may determine similarity between the user query and predicted user intent/application data relative to the content stored in repository 215 and the AI/ML logic.

According to an exemplary embodiment, AI/ML recommendation logic 220 may search, discover, and select the most successful recommendation data within a configured time period (e.g., over the past 6 months or another time frame), and perform text similarity to fetch the most relevant recommendation records related to the predicted user intent, application, or other component of a device, for example. As described, data manager 230 may enable training of the AI/ML recommendation logic 220 based on the recommendation records belonging to the configured time period. Based on this procedure, AI/ML recommendation logic 220 may update vectors, trees, matrix files, and/or other structures used by AI/ML logic to identify similarity.

According to an exemplary embodiment, AI/ML recommendation logic 220 may filter a preconfigured number of recommendation records based on their respective similarity values. For example, AI/ML recommendation logic 220 may compare the similarity values associated with the filtered number recommendation records to one or multiple similarity threshold values.

According to an exemplary embodiment, AI/ML recommendation logic 220 may include weighted ranking logic that may rank contents identified as similar and included in the preconfigured number of recommendation records. As such, a weighted ranking of contents with respect to recommendation record similarities may be calculated. According to an exemplary embodiment, the weighted ranking logic may weight content according to this exemplary expression (1):

$$W.R. \text{ Article } (A) \text{ w.r.t. record similarity} = \frac{\text{Median(Similarity Score of Records)} * \text{Frequency of Usage}(A)}{\sum_{i=1}^{N} \text{Frequency of Articles }(i)}$$

in which the weighted rank of Article (A) may be with respect to recommendation record similarity. AI/ML recommendation logic 220 may select a pre-configured number of the contents that yield the highest score based on expression (1).

According to an exemplary embodiment, AI/ML recommendation logic 220 may include executing a similarity algorithm between the user text query and the weighted ranked contents to obtain a similarity score for each contents. AI/ML recommendation logic 220 may filter and select a subset of the weighted ranked contents based on the contents that have a maximum similarity score. For example, AI/ML recommendation logic 220 may compare the similarity scores to a ranked minimum threshold similarity score to identify the subset of contents.

According to an exemplary embodiment, AI/ML recommendation logic 220 may include computing a weighted similarity score for the subset of top contents to filter to a smaller subset of most relevant content with the highest weighted content score based on the following exemplary expression (2):

$$W.R. \text{ Article } (A) \text{ w.r.t. content similarity} = \frac{\text{Median(Similarity Score of Content)} * \text{Frequency of Usage}(A)}{\sum_{i=1}^{N} \text{Frequency of Articles }(i)}$$

in which the weighted rank of Article (A) may be with respect to article content. AI/ML recommendation logic 220 may select a pre-configured number of the contents that yield the highest score based on expression (1).

According to an exemplary embodiment, AI/ML recommendation logic 220 may include an anomaly procedure that may assist in identifying the most similar content despite perhaps not satisfying multiple criteria, such as frequency of use and similarity of content but may have an extreme or top score for one of the criterion. For example, when a new content is onboarded into repository 215, the content may have good content similarity compared to other articles but may yield a low frequency score because it is new content. According to an exemplary implementation, AI/ML recommendation logic 220 may identify a content associated with the ranking according to exemplary expression (2) and may re-rank those contents when any of the below exemplary conditions may be satisfied:

$$\Delta \text{Frequency (frequency of 1}^{st} \text{ content–any of remaining content)} > X\% \text{ of usage frequency of all contents;} \quad (3)$$

or $$\Delta \text{Similarity (similarity of 1}^{st} \text{ content–any of remaining content)} > Y\% \text{ of similarity of all contents,} \quad (4)$$

in which X and Y may be a configurable percentile value, which may be the same or different values. According to some exemplary embodiments, expression (3) or expression (4) may be a binary choice. As an example, according to an exemplary scenario assume that the output of expression (2) may yield 5 contents, expressions (3) and (4) may be implemented as:

$$\Delta \text{Frequency (frequency of } 1^{st} \text{ content–any of the other 4 contents)} > 90\% \text{ of usage frequency of the 5 contents;} \quad (3)$$

or $$\Delta \text{Similarity (similarity of } 1^{st} \text{ content–any of the other 4 contents)} > 92\% \text{ of similarity of the 5 contents,} \quad (4)$$

According to an exemplary embodiment, AI/ML recommendation logic 220 may reorder or re-rank the contents when the exemplary condition of expression (3) or expression (4) is satisfied.

According to an exemplary embodiment, AI/ML recommendation logic 220 may output a ranked list of contents for selection to the user responsive to the user query. For example, AI/ML recommendation logic 220 may provide a GUI that includes the contents identified. According to an exemplary embodiment, AI/ML recommendation logic 220 may fine tune the logic to minimize false positives. For example, AI/ML recommendation logic 220 may be configured with a threshold value on the weighted ranks for every applicable step or process, as described herein, using one or multiple types of statistical methods, such as Z-score, inter-quartile range, and/or the like.

Performance service logic 225 may include logic that provides monitoring, measuring, and feedback operations. For example, performance service logic 225 may obtain user feedback data from users of the recommendation system with performance management service. The user feedback data may be obtained via an application or a chat bot that allows a user to rate his/her experience in terms of quality of recommended content, such as positive/negative, numerical, thumbs up/thumbs down, or the like, or description. Additionally, or alternatively, the user feedback data may be indirectly obtained from logs of usage associated with one or more of the services. For example, the service information may include the user's search query, a predicted user intent or application, and the recommended results generated. The service information may also include data indicating the user's interaction with the recommendation result. For example, the interaction data may indicate a content selected from the recommendation result by the user, a ranking of the content selected (e.g., the first content presented/ranked, the second content presented/ranked, etc.), that no content was selected, that the user query was modified, how the user query was modified (e.g., refinement of the user query, generalization of the user query, adds or removes modifiers, words, phrases, etc., to/from the user query, repositioning of words, phrases, etc.), whether the user consumed a selected content, and/or other types of user interaction data (e.g., navigation of the user (e.g., via a graphical user interface), time period viewing the recommendation result, etc.).

Performance service logic 225 may evaluate or measure the user feedback data and quantify the user feedback data. According to an exemplary embodiment, performance service logic 225 may compare the quantification (e.g., a numerical value) to a threshold performance value. Based on the comparison, performance service logic 225 may determine whether the threshold performance value is satisfied. The performance metric may be used to measure the performance of the system as well as to create objective functions that may be used to train AI/ML logic of the recommendation system with performance management service. For example, performance service logic 225 may calculate an average number of distinct user query (ADUQ) value among users. An ADUQ value may be calculated as the total number of distinct queries/total number of sessions. In this regard, the higher the ADUQ value the higher degree of user dissatisfaction or difficulty in reaching the desired or suitable content. According to another example, performance service logic 225 may calculate a successful recommendation ratio (SRR) value among users. For example, the SRR value may be calculated as the number of sessions where the user selected results/total number of search sessions. In this regard, the higher the value of the SRR value, the greater user satisfaction and relevance of the content included in the recommendation result. According to yet another example, performance service logic 225 may calculate a refined user query ratio (RUQR) value. For example, the RUQR may be calculated as the number of modified user queries (e.g., adding a modifier to an otherwise similar and previous user query during the same session)/total number of recommendation sessions. In this regard, the higher the value of the RUQR, the greater degree of training may be needed for the user intent prediction and/or recommendation AI/ML logic.

When the threshold performance value is satisfied, performance service logic 225 may continue with the monitoring and measuring services. However, when the threshold performance value is not satisfied, performance service logic 225 may provide a feedback service. For example, performance service logic 225 may generate and transmit an alert to an administrator of the recommendation system with performance management service. According to some exemplary embodiments, performance service logic 225 may invoke a remedial operation (e.g., retraining of a model or AI/ML logic). Performance service logic 225 may include root cause and/or diagnostic analytics that may generate information relating to the lack of expected performance.

Data manager 230 may include logic that manages retraining of AI/ML recommendation logic 220. For example, data manager 230 may monitor and evaluate recommendation records stored in repository 215. Based on the evaluation, data manager 230 may generate training data and provide the training data to AI/ML recommendation logic 220. The training data may be based on recommendation records and associated recommended content that was successful and/or not successful in resolving an issue or problem associated with an application/device indicated by a user. According to an exemplary embodiment, data manager 230 may periodically (e.g., according to a schedule) retrain AI/ML recommendation logic 220 to minimize data draft issues. AI/ML recommendation logic 220 may generate and/or update a similarity model (e.g., tree, vector space, etc.) based on the training data. Data manager 230 may also manage the retaining of AI/ML intent application prediction logic 210 in a similar manner.

Communication link 235 may include a hardware link (e.g., a bus, a shared memory space, etc.), a software link (e.g., inter-process communication (IPC) or the like), an application programming interface (API), or some other type of communicative link (e.g., communication link 115). Communication link 235 may enable communication between one or multiple other components of components 200. For example, API logic 205 may communicate with AI/ML intent/application prediction logic 210 via communication link 235.

FIG. 2 illustrates exemplary components that may provide an exemplary embodiment of the recommendation system with performance management service, however according to other exemplary embodiments, additional, fewer, and/or different components may be implemented. For example, a single component may be implemented as multiple components and/or multiple components may be implemented as a single component. Additionally, or alternatively, the exemplary components may be implemented on a single device or multiple devices.

Figure 3:
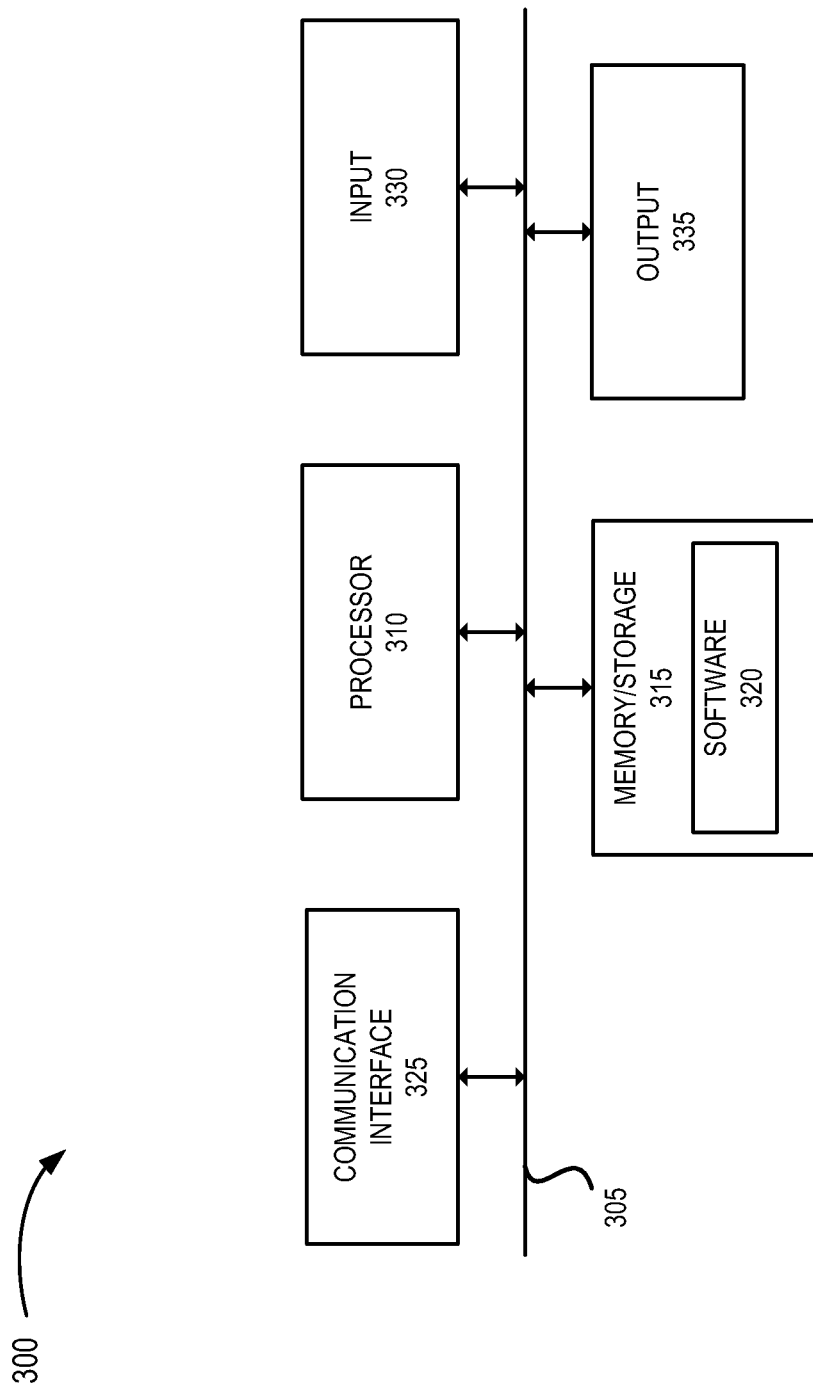
FIG. 3 is a diagram illustrating exemplary components of a device that may correspond to one or more of the devices illustrated and described herein.

FIG. 3 is a diagram illustrating exemplary components of a device 300 that may be included in one or more of the devices described herein. For example, device 300 may correspond to a component or components of components 200, network device 107, and/or end device 110. As illustrated in FIG. 3, device 300 includes a bus 305, a processor 310, a memory/storage 315 that stores software 320, a communication interface 325, an input 330, and an output 335. According to other embodiments, device 300 may include fewer components, additional components, different components, and/or a different arrangement of components than those illustrated in FIG. 3 and described herein.

Bus 305 includes a path that permits communication among the components of device 300. For example, bus 305 may include a system bus, an address bus, a data bus, and/or a control bus. Bus 305 may also include bus drivers, bus arbiters, bus interfaces, clocks, and so forth.

Processor 310 includes one or multiple processors, microprocessors, data processors, co-processors, graphic processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 310 may be implemented as hardware (e.g., a microprocessor, etc.), a combination of hardware and software (e.g., a SoC, an ASIC, etc.), may include one or multiple memories (e.g., cache, etc.), etc.

Processor 310 may control the overall operation or a portion of operation(s) performed by device 300. Processor 310 may perform one or multiple operations based on an operating system and/or various applications or computer programs (e.g., software 320). Processor 310 may access instructions from memory/storage 315, from other components of device 300, and/or from a source external to device 300 (e.g., a network, another device, etc.). Processor 310 may perform an operation and/or a process based on various techniques including, for example, multithreading, parallel processing, pipelining, interleaving, etc.

Memory/storage 315 includes one or multiple memories and/or one or multiple other types of storage mediums. For example, memory/storage 315 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other type of memory. Memory/storage 315 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 315 may include drives for reading from and writing to the storage medium.

Memory/storage 315 may be external to and/or removable from device 300, such as, for example, a Universal Serial Bus (USB) memory stick, a dongle, a hard disk, mass storage, off-line storage, or some other type of storing medium. Memory/storage 315 may store data, software, and/or instructions related to the operation of device 300.

Software 320 includes an application or a program that provides a function and/or a process. As an example, with reference to network 107, software 320 may include an application that, when executed by processor 310, provides a function or a process of the recommendation system with performance management service, as described herein. Software 320 may also include firmware, middleware, microcode, hardware description language (HDL), and/or other form of instruction. Software 320 may be virtualized. Software 320 may further include an operating system (OS) (e.g., Windows, Linux, Android, proprietary, etc.).

Communication interface 325 permits device 300 to communicate with other devices, networks, systems, and/or the like. Communication interface 325 may includes one or multiple wireless, wired, and/or optical interfaces. For example, communication interface 325 may include one or multiple transmitters and receivers, or transceivers. Communication interface 325 may operate according to a protocol stack and a communication standard. Communication interface 325 may include an antenna. Communication interface 325 may include various processing logic or circuitry (e.g., multiplexing/de-multiplexing, filtering, amplifying, converting, error correction, etc.). Communication interface 325 may be implemented as a point-to-point interface, a service based interface, and/or another suitable interface.

Input 330 permits an input into device 300. For example, input 330 may include a keyboard, a mouse, a display, a touchscreen, a touchless screen, a button, a switch, an input port, speech recognition logic, and/or some other type of visual, auditory, tactile, etc., input component. Output 335 permits an output from device 300. For example, output 335 may include a speaker, a display, a touchscreen, a touchless screen, a light, an output port, and/or some other type of visual, auditory, tactile, etc., output component.

As previously described, a network device may be implemented according to various computing architectures (e.g., centralized, distributed, etc.) and according to various network architectures (e.g., a virtualized function, a server, a client, etc.). Device 300 may be implemented in the same manner. For example, as a virtualized function, device 300 may be instantiated, created, deleted, or have some other operational state during its life-cycle (e.g., refreshed, paused, suspended, rebooted, or another type of state or status), using well-known virtualization technologies (e.g., hypervisor, container engine, virtual container, virtual machine, etc.) in a public/private cloud or other type of network.

Device 300 may perform a process and/or a function, as described herein, in response to processor 310 executing software 320 stored by memory/storage 315. By way of example, instructions may be read into memory/storage 315 from another memory/storage 315 (not shown) or read from another device (not shown) via communication interface 325. The instructions stored by memory/storage 315 cause processor 310 to perform a process described herein. Alternatively, for example, according to other implementations, device 300 performs a process described herein based on the execution of hardware (processor 310, etc.).

Figure 4:
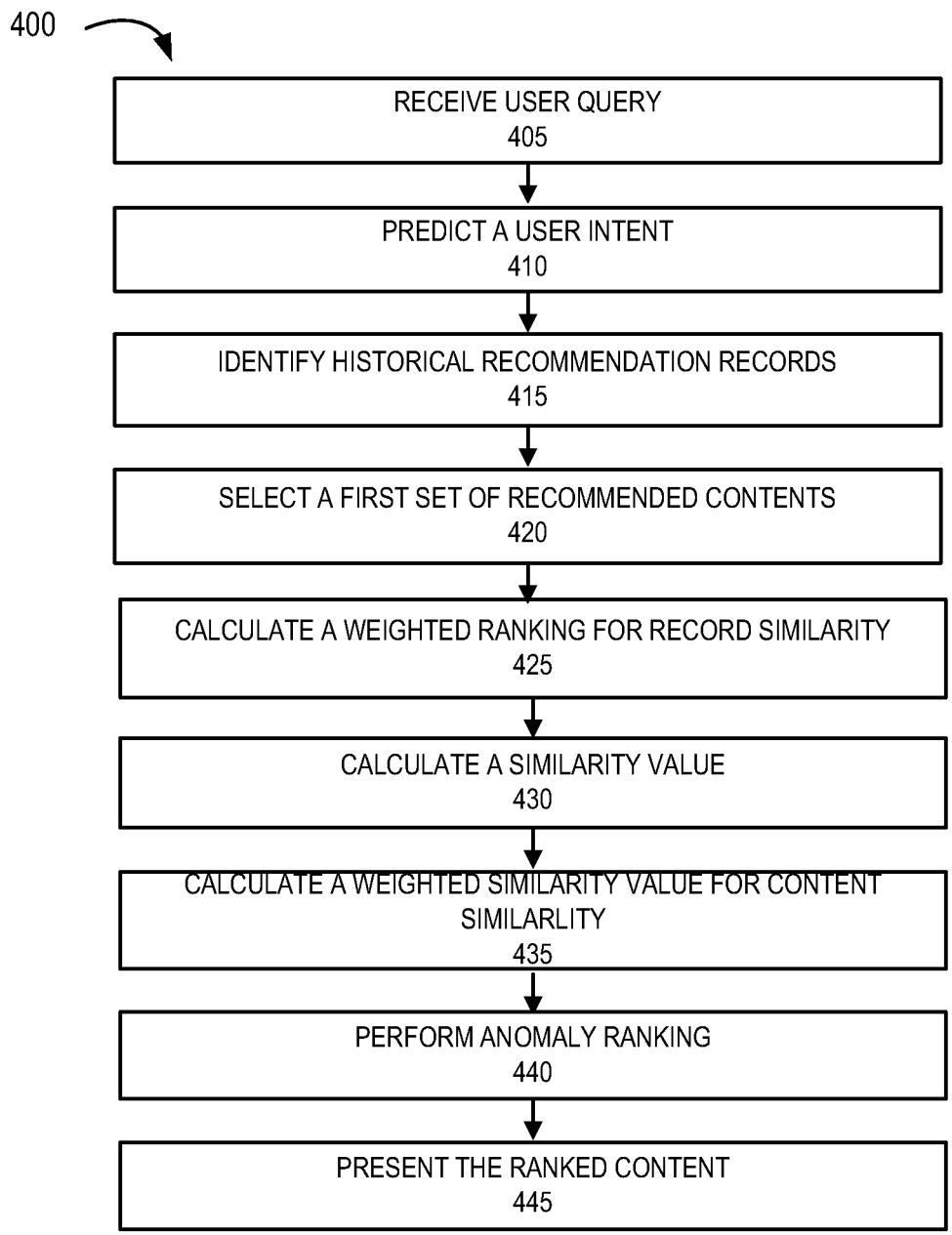
FIG. 4 is a flow diagram illustrating an exemplary process of an exemplary embodiment of the recommendation system with performance management service.

FIG. 4 is a flow diagram illustrating an exemplary process 400 of an exemplary embodiment of the recommendation system with performance management service. According to an exemplary embodiment, a network device 107, which may include components 200, may perform steps of process 400. For example, processor 310 executes software 320 to perform the steps illustrated in FIG. 4 and described herein.

In block 405, network device 107 may receive a user query. For example, API logic 205 may receive the user query, which may relate to an issue associated with an application or device, from a user via end device 110.

In block 410, network device 107 may predict a user intent. For example, AI/ML intent/app prediction logic 210 may predict the user intent based on the user query and a classification model, as described herein.

In block 415, network device 107 may identify historical recommendation records. For example, AI/ML recommendation logic 220 may select the historical recommendation records associated with successful recommendations, which may include user query, user intent, incident description, and/or identifiers of recommended content, relating to a pre-configured time period.

In block 420, network device 107 may select a first set of recommended contents. For example, AI/ML recommendation logic 220 may execute a model for text similarity across the recommended contents of the records based on the user query and predicted application. AI/ML recommendation logic 220 may select the first set of recommended contents based on a comparison between their similarity values and a threshold similarity value.

In block 425, network device 107 may calculate a weighted ranking. For example, AI/ML recommendation logic 220 may calculate the weighted ranking associated with each content based on similarity and frequency of use criteria, such as according to exemplary expression (1), as described herein. Network device 107 may filter the number of contents based on a comparison between their weighted ranking value and a threshold weighted ranking value and may yield a first subset of the first set.

In block 430, network device 107 may calculate a similarity value. For example, AI/ML recommendation logic 220 may calculate a similarity value between the entire text of each content and the user query. Network device 107 may filter the number of contents based on a comparison between their similarity values and a threshold similarity value, which may yield a second subset of the first subset.

In block 435, network device 107 may calculate a weighted similarity value. For example, AI/ML recommendation logic 220 may calculate the weighted similarity value associated with each content based on similarity and frequency of use according to exemplary expression (2), as described herein. Network device 107 may filter the number of contents based on a comparison between their weighted similarity values and a threshold weighted similarity value, and may yield a third subset of the second subset.

In block 440, network device 107 may perform anomaly ranking. For example, AI/ML recommendation logic 220 may determine whether to re-rank the contents of the third subset based on exemplary expressions (3) and/or (4), as described herein. For example, when a content is new, a frequency of use value may be low (e.g., lowest frequency of use value or at least lower than some) relative to other contents, including other content in the third subset, but the new content may have an extremely high similarity value. According to another example, a content may have an extremely high frequency of use value (e.g., highest frequency of use value or at least higher than some) relative to other contents, including other content in the third subset. By way of further example, agents or product support personnel may use frequency use the content to resolve incidents for the issue of relevance. However, the content may have a low similarity value. For example, the content may resolve a backend issue in the network that may not be directly linked to the application of relevance.

In block 445, network device 107 may present the ranked content. For example, network device 107 may generate a user interface that includes links to the ranked content. The content may include an article and/or multimedia (e.g., pictures, audio/video, etc.) that includes a corrective measure that enables the user to resolve the issue, for example.

FIG. 4 illustrates an exemplary embodiment of a process of the recommendation system with performance management service, however according to other exemplary embodiments, the recommendation system with performance management service may perform additional operations, fewer operations, and/or different operations than those illustrated and described in relation to FIG. 4. For example, one or more of blocks 410 through 435 may be omitted.

As set forth in this description and illustrated by the drawings, reference is made to "an exemplary embodiment," "exemplary embodiments," "an embodiment," "embodiments," etc., which may include a particular feature, structure, or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks has been described with regard to the process illustrated in FIG. 4, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software executed by hardware. For example, a process or a function may be implemented as "logic," a "component," or an "element." The logic, the component, or the element, may include, for example, hardware (e.g., processor 310, etc.), or a combination of hardware and software (e.g., software 320). The exemplary embodiments have been described without reference to the specific software code since the software code can be designed to implement the embodiments based on the description herein and commercially available software design environments and/or languages. For example, diverse types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 310) of a device. A non-transitory storage medium includes one or more of the storage mediums described in relation to memory/storage 315. The non-transitory computer-readable storage medium may be implemented in a centralized, distributed, or logical division that may include a single physical memory device or multiple physical memory devices spread across one or multiple network devices.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Collection, storage, and use of personal information may be provided in an appropriately secure manner reflective of the type of information, for example, through various encryption and anonymization techniques for particularly sensitive information.

No element, act, or instruction described in the present application should be construed as critical or essential to the embodiments described herein unless explicitly described as such.

All structural and functional equivalents to the elements of the various aspects set forth in this description that are known in the art or later come to be known in the art are expressly incorporated herein by reference and are intended to be encompassed by the claims.

What is claimed is:

1. A method comprising:
 receiving, by a network device, a user query from a user via an end device;
 predicting, by the network device, an application or a device to which an issue and the user query relate;
 selecting, by the network device based on the user query, recommended contents associated with historical user queries and successful recommendations;
 calculating, by the network device, a weighted ranking value for a first subset of the recommended contents based on similarity and frequency of use values;
 calculating, by the network device, a similarity value for the first subset based on the user query;
 calculating, by the network device, a weighted similarity value for a second subset of the first subset based on similarity and frequency of use values;
 re-ranking, by the network device based on determining that at least one of the recommended contents of a third subset of the second subset is an anomaly content; and
 presenting, by the network device to the user based on the re-ranking, the third subset that addresses the issue relating to the application or the device.

2. The method of claim 1, wherein the anomaly content has a highest similarity value or a lowest frequency of use value relative to other recommended contents of the third subset.

3. The method of claim 1, further comprising:
 receiving, by the network device from the user after the presenting, feedback data relating to a success in resolving the issue; and
 retraining, by the network device, a similarity model of the network device based on the feedback data.

4. The method of claim 1, wherein the similarity value for the first subset is calculated based on a similarity between the user query and an entirety of a text included in each of the recommended contents.

5. The method of claim 1, wherein the weighted similarity value is calculated based on a median similarity value.

6. The method of claim 1, wherein the selecting further comprises:
 selecting, by the network device, the recommended contents based on predicted application data or predicted device data.

7. The method of claim 1, wherein the device includes a set top box or a mobile device.

8. The method of claim 1, wherein the network device is included in a customer support network.

9. A network device comprising:
 a processor configured to:
  receive a user query from a user;
  predict an application or a device to which an issue and the user query relate;
  select, based on the user query, recommended contents associated with historical user queries and successful recommendations;
  calculate a weighted ranking value for a first subset of the recommended contents based on similarity and frequency of use values;
  calculate a similarity value for the first subset based on the user query;
  calculate a weighted similarity value for a second subset of the first subset based on similarity and frequency of use values;
  re-rank, based on determining that at least one of the recommended contents of a third subset of the second subset is an anomaly content; and
  present, to the user based on the re-ranking, the third subset that addresses the issue relating to the application or the device.

10. The network device of claim 9, wherein the anomaly content has a highest similarity value or a lowest frequency of use value relative to other recommended contents of the third subset.

11. The network device of claim 9, wherein the processor is further configured to:
 receive, from the user after a presentment of the recommended contents of the third subset, feedback data relating to a success in resolving the issue; and retrain a similarity model of the network device based on the feedback data.

12. The network device of claim 9, wherein the similarity value the first subset is calculated based on a similarity between the user query and an entirety of a text included in each of the recommended contents.

13. The network device of claim 9, wherein the weighted similarity value is calculated based on a median similarity value.

14. The network device of claim 9, wherein, when selecting, the processor is further configured to:
    select the recommended contents based on predicted application data or predicted device data.

15. The network device of claim 9, wherein the device includes a set top box or a mobile device.

16. The network device of claim 9, wherein the network device is included in a customer support network.

17. A non-transitory computer-readable storage medium storing instructions executable by a processor of a network device, which when executed, cause the network device to:
    receive a user query from a user;
    predict an application or a device to which an issue and the user query relate;
    select, based on the user query, recommended contents associated with historical user queries and successful recommendations;
    calculate a weighted ranking value for a first subset of the recommended contents based on similarity and frequency of use values;
    calculate a similarity value for the first subset based on the user query;
    calculate a weighted similarity value for a second subset of the first subset based on similarity and frequency of use values;
    re-rank, based on determining that at least one of the recommended contents of a third subset of the second subset is an anomaly content; and
    present, to the user based on the re-ranking, the third subset that addresses the issue relating to the application or the device.

18. The non-transitory computer-readable storage medium of claim 17, wherein the instructions further comprise instructions, which when executed, cause the network device to:
    receive, from the user after a presentment of the recommended contents of the third subset, feedback data relating to a success in resolving the issue; and
    retrain a similarity model of the network device based on the feedback data.

19. The non-transitory computer-readable storage medium of claim 17, wherein the anomaly content has a highest similarity value or a lowest frequency of use value relative to other recommended contents of the third subset.

20. The non-transitory computer-readable storage medium of claim 17, wherein the similarity value for each of the first subset is calculated based on a similarity between the user query and an entirety of a text included in each of the recommended contents.

* * * * *